(12) United States Patent
Gueyvandov et al.

(10) Patent No.: US 7,695,168 B2
(45) Date of Patent: Apr. 13, 2010

(54) OPTIC FILM WITH A PLURALITY OF STACKED PYRAMID ELEMENTS FOR REFRACTING LIGHT

(75) Inventors: Arthur Roubenovich Gueyvandov, Moscow District (RU); Aleksandr Victorovich Morozov, Moscow District (RU)

(73) Assignee: Samsung Electronics Co., Ltd. (KR)

( * ) Notice: Subject to any disclaimer, the term of this patent is extended or adjusted under 35 U.S.C. 154(b) by 329 days.

(21) Appl. No.: 11/538,447

(22) Filed: Oct. 4, 2006

(65) Prior Publication Data

US 2007/0115573 A1 May 24, 2007

(30) Foreign Application Priority Data

Oct. 6, 2005 (RU) .............................. 2005130958

(51) Int. Cl.
*G02F 1/13357* (2006.01)
(52) U.S. Cl. ...................................... 362/339; 362/620
(58) Field of Classification Search ................. 362/339, 362/620, 626, 627
See application file for complete search history.

(56) References Cited

U.S. PATENT DOCUMENTS

| | | | |
|---|---|---|---|
| 2,022,639 A | 11/1935 | Stimson | |
| 5,467,417 A | 11/1995 | Nakamura et al. | |
| 5,917,664 A | 6/1999 | O'Neill et al. | |
| 6,545,827 B1 * | 4/2003 | Okabe et al. | 359/837 |
| 2002/0080598 A1 * | 6/2002 | Parker et al. | 362/31 |
| 2002/0097496 A1 * | 7/2002 | Lu | 359/628 |
| 2003/0234900 A1 * | 12/2003 | Kim | 349/112 |
| 2004/0109303 A1 * | 6/2004 | Olczak | 362/19 |

FOREIGN PATENT DOCUMENTS

| | | | | |
|---|---|---|---|---|
| JP | 07230002 A | * | 8/1995 | |
| JP | 09005505 | | 1/1997 | |
| JP | 09005505 A | * | 1/1997 | |
| JP | 2000231103 A | * | 8/2000 | |
| WO | WO 2005005881 A1 | * | 1/2005 | |
| WO | WO 2005012988 A1 | * | 2/2005 | |

* cited by examiner

*Primary Examiner*—Alessandro Amari
*Assistant Examiner*—Mark Consilvio
(74) *Attorney, Agent, or Firm*—Cantor Colburn LLP

(57) ABSTRACT

Optical film, including a set of elements disposed adjacent to each other and an external surface made of optically transparent material, each element including a lower pyramid being a truncated pyramid, an upper pyramid being a non-truncated pyramid and a plurality of element planes. A lower base of the lower pyramid defines the base of the element and an upper base of the lower pyramid coincides with a lower base of the upper pyramid. The element bases disposed adjacent to each other form a common surface of the set of the elements and the lower and upper pyramids protrude from one side of the common surface. The external surface covers the plurality of element planes.

13 Claims, 4 Drawing Sheets

OPTIC FILM WITH A PLURALITY OF STACKED PYRAMID ELEMENTS FOR REFRACTING LIGHT

This application claims priority to Russian Patent Application 2005130958 filed on Oct. 6, 2005 and all the benefits accruing therefrom under 35 U.S.C §119, the contents of which are herein incorporated by reference in its entirety.

BACKGROUND OF THE INVENTION

The present invention generally relates to the optical field, namely to optic films. More particularly, the present invention relates to optic films used in liquid crystal device (LCD) displays and backlight devices for passing of light, where light falls on one side of a film, and for reflecting of light, where light falls on another side of a film.

The light of a backlight device may not used efficiently. For example, the light of a lamp is reflected partly from the surrounding surfaces and returning to the lamp, causing the lamp blinking or other unwanted effects. It is estimated that only 5 percent of the backlight device radiation reaches an observer because of polarization and a large number of layers in a LCD of the pass-through type. An increase of brightness may be achieved by increasing the lamp power or by using the additional sources of light. This method results in an increase of energy consumption (it is undesirable for portable devices), an increase in cost of the display device and a decreasing of the device's reliability. Thus, a compromise in display design is often sought, sacrificing one group of the LCD parameters for another group's benefit. One of the methods to increase the efficiency of the LCD, includes the development of a special optical construction of backlight device using optical antireflection films.

Optical antireflection films (see U.S. Pat. No. 5,917,664 [1], for example) include a set of prisms, which provides optimal redirection of light from the light source of a backlight device to the observer. This configuration may also allow improved brightness and evenness of the LCD luminance by directing the light of the backlight device, mainly, in a normal (perpendicular) direction to the display surface.

The set of prisms, which have a three-angled and more complicated cross-section, or square pyramids in modified form of the cross-section, are used in displays as optical antireflection films according to the JP Pat. No 9,005,505 [2], for example. Such constructions are often used as optical antireflection films, and the main problem discussed in [2] is to narrow the directional diagram along specified direction. The principal feature of such optical antireflection films is that a refraction coefficient of pyramids and prisms in such films is more than the refraction coefficient of the material covering them, which is necessary for a full inside reflection of light.

The use of pyramids and cone shells on the optical antireflection films prism surface for improving the directional diagram of radiation along a specified direction is also described in U.S. Pat. No. 5,467,417 [3].

U.S. Pat. No. 2,022,639 [4], includes the set of pyramids made of an optically transparent material, which changes the direction of light passing through the film. Such reflector reflects the light which falls on it along several predetermined directions. The predetermined directions number depends on the number of planes of the pyramids.

The drawback of the above described configurations consists of the insufficient reflective power of one side of a film and insufficient pass-through power of the other side of the film.

The present invention is directed to an optical film which offers better reflection of light falling from one side, and better pass-through of light falling from the other side.

BRIEF SUMMARY OF THE INVENTION

One exemplary embodiment provides an optical film including a set of elements disposed adjacent to each other and an external material Each element includes a lower pyramid being a truncated pyramid, an upper pyramid being a non-truncated pyramid and element planes. A lower base of the lower pyramid defines the base of the element and an upper base of the lower pyramid coincides with a lower base of the upper pyramid. The bases of elements form a common surface and are located on one side of that surface. The external material covers the element planes.

The refraction coefficient of material of each pyramid is less than the refraction coefficient of the external material.

The refraction coefficients of all pyramids of each film element are the same.

The refraction coefficient of all pyramids of all film elements are the same.

The upper and lower pyramids are asymmetrical.

The refraction coefficient of the pyramid material and external material is in the range of 1 to 2.1.

The pyramids include at least three planes.

The external material covers all planes of all pyramid of the set of elements.

The planes of the pyramids and the external material contain an antireflective layer.

The external material includes layers with different refraction coefficients.

Another exemplary embodiment provides an optical film including a set of elements disposed adjacent to each other and an external surface including an external material and a first refraction coefficient. Each element includes a lower pyramid, an intermediate pyramid and an upper pyramid. The lower pyramid includes a first lower base, a first upper base, a first vertex angle, a plurality of first inclined planes and a second refraction coefficient, the lower pyramid being a truncated pyramid. The intermediate pyramid includes a second lower base, a second upper base, a second vertex angle, a plurality of second inclined planes and a third refraction coefficient, the intermediate pyramid being a truncated pyramid. The upper pyramid includes a third lower base, a third upper base, a third vertex angle, a plurality of third inclined planes and a fourth refraction coefficient, the upper pyramid being a non-truncated pyramid. Each element also includes a plurality of element planes including the first, second and third inclined planes. The first lower base defines a base of the element and the first and second upper base coincide with the second and third lower base, respectively. Bases of each element disposed adjacent to one another form a common surface of the plurality of elements, the lower, intermediate and upper pyramids protruding from one side of the common surface. The external material covers the plurality of element planes.

Another exemplary embodiment provides increased reflection capability of an optical film for light falling from one side of a film, and improvement of pass-through capability for light falling from the other side of the film. The optical film includes a set of elements and external material covering the elements. Each element includes at least, one truncated pyramid and one non-truncated pyramid. By using a combination of refraction coefficients of an optically transparent pyramid material and the external material and a selection of vertex angle values, essentially full inside reflection of light is provided.

BRIEF DESCRIPTION OF THE DRAWINGS

The above and other advantages of the present invention will become more apparent by describing in detail exemplary embodiments thereof with reference to the accompanying drawings in which.

DETAILED DESCRIPTION OF THE INVENTION

Figure 1:
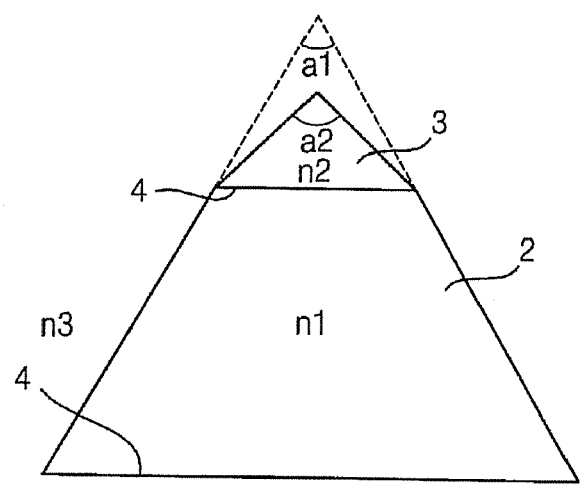
FIG. 1 is a cross-sectional view of an exemplary embodiment of an optical film element, which element comprises two pyramids (cross-section, passing through the vertexes of pyramids normally to their bases) in accordance with the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower" and "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of upper and lower. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 2:
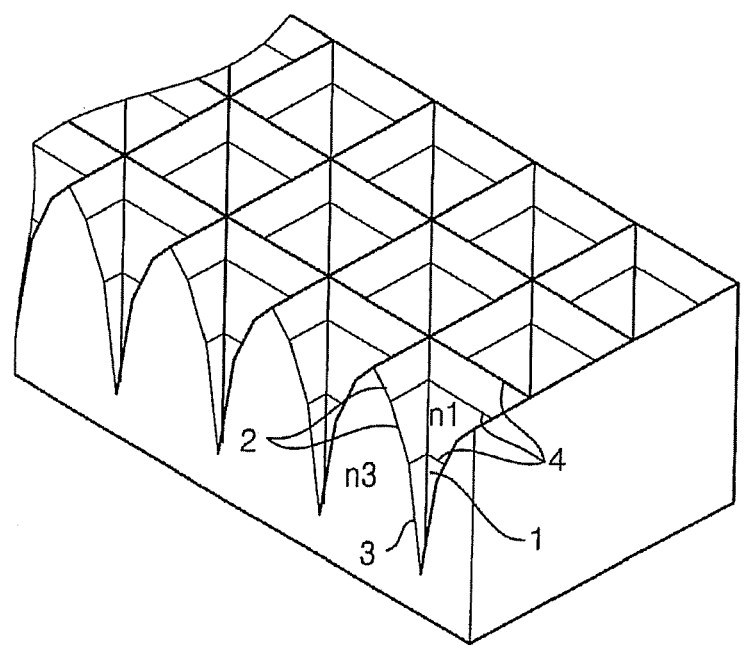
FIG. 2 is a perspective view of an exemplary embodiment of an optical film with elements, which elements comprise three pyramids (three-dimensional view), in accordance with the invention, where the material of the elements has the refraction coefficient n1 and the external material has the refraction coefficient n3.
Figure 3:
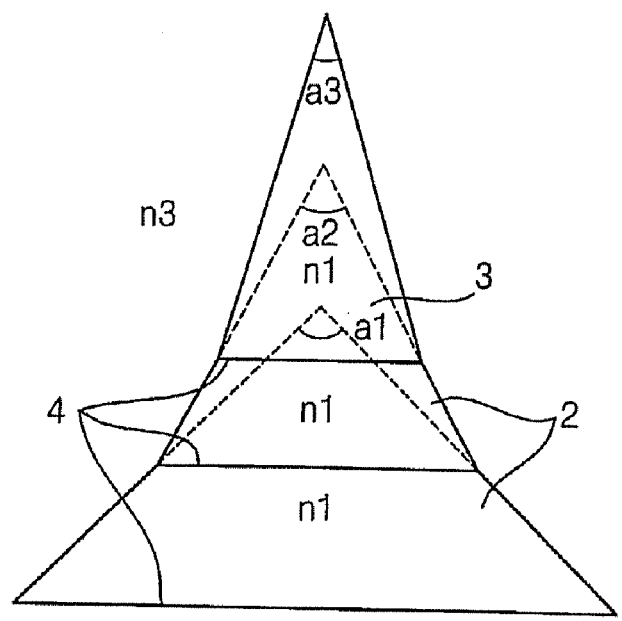
FIG. 3 is a cross-sectional view of another exemplary embodiment of an optical film element, which element comprises three pyramids (cross-section, passing through the vertexes of pyramids normally to their bases), in accordance with the invention.

FIGS. 1 and 3 show cross-sectional views of an exemplary embodiment of an optical film element in accordance with the invention The optical film element may be made of optically transparent material. The optical film element includes a truncated pyramid 2 and a non-truncated pyramid 3. In exemplary embodiments, the optical film element may have one or more of the truncated pyramid 2 and/or the non-truncated pyramid 3. Alternative embodiments may include configurations where there is one truncated pyramid 2 and one non-truncated pyramid 3 as illustrated in FIG. 2 and two of the truncated pyramid 2 and one non-truncated pyramid 3 as illustrated in FIG. 3.

Both the truncated pyramid 2 and the non-truncated pyramid 3 include a base 4. A truncated pyramid 2 essentially includes two bases 4, one larger base 4 at the bottom and one smaller base 4 at the top, whereas the non-truncated pyramid 3 includes one base 4 at the bottom. In exemplary embodiments where the truncated pyramid 2 and the non-truncated pyramid 3 are configured in a stacked manner, the bases 4 may be located one over another such that the large (bottom) base 4 of the first (or lowest) truncated pyramid serves as the main base of the element. Where there are multiple truncated pyramids 2, the larger (or bottom) base of each following truncated pyramid 2 coincides with the smaller (or top) base of the preceding truncated pyramid 2. The base of the non-truncated pyramid 3 corresponds with the smaller (or top) base of the preceding or intermediate truncated pyramid 2.

A vertex angle α is formed at an apex of each pyramid at a meeting point of two opposing inclined planes or sides of the pyramid. For a truncated pyramid 2, the apex is considered the meeting point where the sides would meet if they were extended from the base, such as shown in dotted lines in FIGS. 1 and 3. The apex of the non-truncated pyramid may also be considered as a base 4. In exemplary embodiments, the vertex angles α of the pyramids within an element may be equal to each other or may be of different values. In a preferred exemplary embodiment, the vertex angles α of at least two pyramids are not equal to each other.

Figure 4:
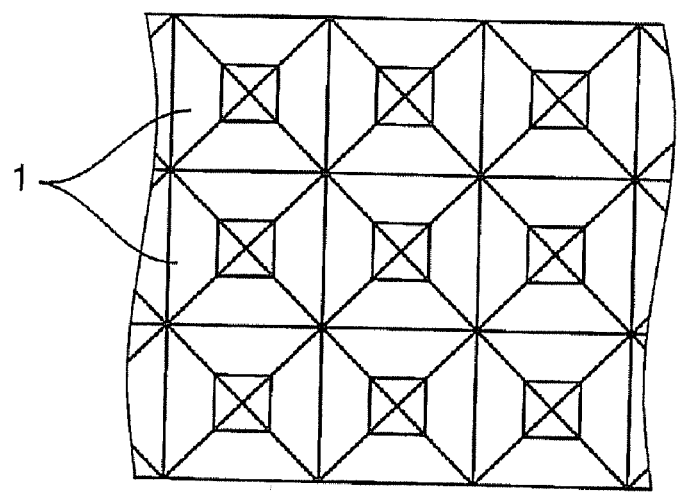
FIG. 4 is a perspective view of another exemplary embodiment of an optical film with elements, which elements comprise tetrahedral pyramids (view from above), in accordance with the invention.
Figure 5:
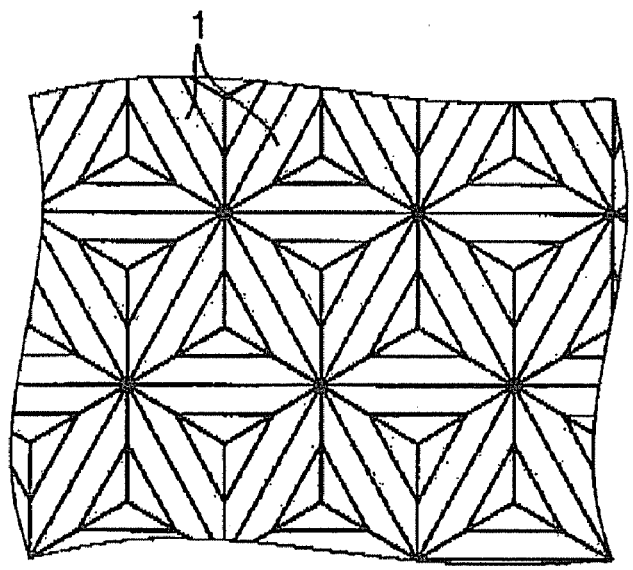
FIG. 5 is a perspective view of another exemplary embodiment of an optical film with elements, which elements comprise trihedral pyramids (view from above), in accordance with the invention.

FIGS. 4 and 5 are perspective views exemplary embodiments of an optical film with elements including tetrahedral pyramids and trihedral pyramids, respectively, as viewed from above, in accordance with the invention.

Multiple elements may be positioned next to or joined to one another such that the main bases of the multiple elements form a substantially single or common surface. The pyramids may have three or more inclined planes. Alternative embodiments of multiple elements disposed adjacent to each other to form the single surface include configurations of pyramids having three inclined planes (FIG. 5) and pyramids having four inclined planes (FIG. 4). In one exemplary embodiment, the pyramids of the multiple elements are located or protruded on one side of the single surface.

In another exemplary embodiment the pyramids of the elements may be symmetrical or asymmetrical. Symmetry may be considered with respect to the dimensions of the base of the elements and/or to the centeredness of the uppermost (non-truncated) pyramid apex relative to the center of the element base. Alternative embodiments include configurations where the dimensions of the (sides of) the element base are not all equal (asymmetrical), where the dimensions of the element base are all equal (symmetrical). Other alternative embodiments include configurations where the uppermost pyramid apex does not correspond with the center of the element base (asymmetrical) and where the uppermost pyramid apex does correspond with the center of the element base (symmetrical).

The vertex angles α and refraction coefficients n of the material of the elements may be chosen in such a way, to provide maximum pass-through of light falling on the pyramid planes from one side of the film, and also to provide for maximum reflection of light falling on the bases of elements from another side of the film. The material of the pyramids of the elements may be substantially equal (FIGS. 2 and 3, n1) or may have various combinations of refraction coefficients (FIG. 1, n1 and n2). In other exemplary embodiments, the refraction coefficients of the element material may be in the range of about 1 to about 2.1.

Figure 6A:
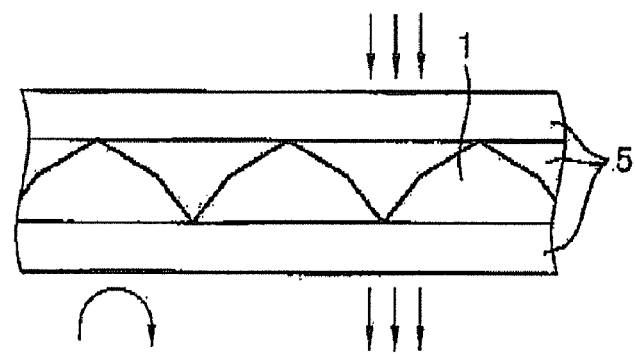
FIGS. 6A to 6C are cross-sectional views of exemplary embodiments of an optical film with elements, which elements comprise two pyramids (cross-section, passing through the vertexes of pyramids normally to their bases), where the arrows indicate the falling, passing through and reflected light.
Figure 6B:
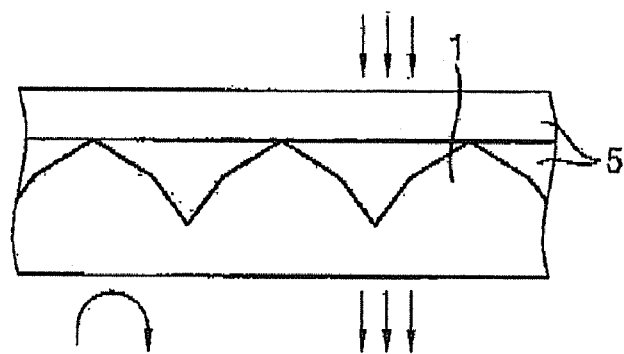
Figure 6C:
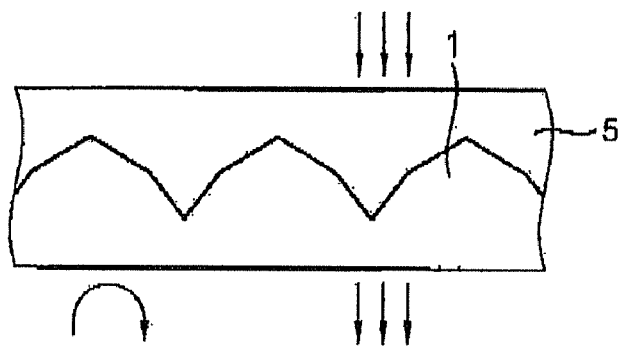

FIGS. 6A to 6C are cross-sectional views of exemplary embodiments of an optical film with elements including two pyramids, as viewed in a cross-section, passing through the vertexes of pyramids normal to their bases, where arrows indicate the falling, passing through and reflected light.

The planes of the pyramids of the elements and the main base of the elements may be covered by an external material. The external material may be optically transparent and/or may include multiple layers. The multiple layers of external material may have different refraction coefficients or may have refraction coefficients that are essentially equal. Alternative exemplary embodiments of the optical film may include the elements being covered by three (FIG. 6A), two (FIG. 6B) and one (FIG. 6C) layers 5 of the external material. In exemplary embodiments, the refraction coefficients of the material of the pyramids of the elements are less then the refraction coefficient of the external material. As illustrated in FIG. 1, refraction coefficient n3 is greater than n1 and n2 and in FIGS. 2 and 3, refraction coefficient n3 is greater than n1. In other exemplary embodiments, the planes of the pyramids and the external material may further include antireflective layers.

In one exemplary embodiment, one layer 5 fills up cages (or spaces defined by the inclined planes of the pyramids) between film elements. The layers 5 of the external material may be disposed in any of a number of configurations corresponding to the top, bottom and along the inclined planes of the pyramids and surfaces of the elements. FIG. 6A illustrates two substantially planar layers of external material 5, one disposed over the apexes of the pyramids and one on the main bases of the pyramids. A third layer 5 in FIG. 6A is formed substantially corresponding to the inclined faces of the elements. FIG. 6B shows one substantially planar layer 5 over the apexes and the other formed corresponding to the inclined faces of the elements. FIG. 6C illustrates a single layer 5 of the external material disposed corresponding to the inclined faces of the elements and between adjacent elements.

Referring again to FIG. 3, one exemplary embodiment according to the present invention provides the optical film including the set of elements having truncated pyramids 2 and non-truncated pyramid 3 with square section (base) 4. In each element, the first or lower (truncated) pyramid 2 has the vertex angle α1, which is equal to approximately 56°. The second or intermediate (truncated) pyramid 2 has the vertex angle α2, which is equal to approximately 52°, and is located on top of the upper base 4 of the first pyramid 2. The third or upper (non-truncated) pyramid 3 has the vertex angle α3, which is equal to approximately 36°, and is located on the top of the upper base 4 of the second pyramid 2 The refraction coefficient of the material of the first, second and third pyramids, indicated by n1, is equal to 1. The set of elements is covered by the external material with refraction coefficient, indicated by n3, which is equal to 1.69.

The optical film includes the following optical characteristics for a light with wave-length 546 nanometers: pass-through light radiated by a diffusive extensive source from the direction of material n3, amounts to about 70%, pass-through light radiated by a diffusive extensive source from the direction of material n1 amounts to about 50%. In exemplary embodiment, the optical film with the above characteristics may be produced by a simple pressing between two rollers.

Exemplary embodiments of the optical film according to the present invention used in LCD's allow improved direction of the backlight radiation to the observer with a minimal loss of intensity, preserving the reflectivity of the opposite side of film, as the LCD according to the present invention is capable of modulating the external light in reflect mode and in pass-through mode.

The above implementation of the claimed invention was offered with the purpose of illustration, only, and it is clear for specialists that various modifications, adaptations and replacements are possible, insofar as they do not go beyond the scope and meaning of the present invention as described in the enclosed claims.

What is claimed is:

1. An optical film comprising:
   a set of elements disposed adjacent to each other; and
   an external material comprising a first layer, a second layer and a third layer, each layer having a refraction coefficient;
   wherein each element comprises;
      a lower pyramid comprising a first lower base, a first upper base, a first vertex angle, a plurality of first inclined planes and a second refraction coefficient, the lower pyramid being a truncated pyramid;
      an upper pyramid comprising a second lower base, a second upper base, a second vertex angle, a plurality of second inclined planes and a third refraction coefficient, the upper pyramid being a non-truncated pyramid; and
      a plurality of element planes comprising the first inclined planes and the second inclined planes;
   wherein the first lower base defines a base of the element and the first upper base coincides with the second lower base;
   wherein the first lower base of each element disposed adjacent to each other forms a common surface of the plurality of elements, the lower and upper pyramids protruding from one side of the common surface;
   wherein the external material covers the plurality of element planes, the first layer being disposed between the elements, the second layer being disposed over second upper bases of the elements, the third layer being disposed beneath the first lower bases of the element, and the refraction coefficient of each of the first, second and third layers of the external material is greater than the second and third refraction coefficients of the lower pyramid and the upper pyramid, respectively,
   wherein the refraction coefficient of the third layer is different from the second refraction coefficient of the lower pyramid, and
   wherein the first and second inclined planes each comprise only three inclined planes, respectively.

2. The optical film as in claim 1, wherein the lower pyramid, the upper pyramid and the external material comprises optically transparent material.

3. The optical film as in claim 1, wherein the first vertex angle and the second vertex angle are unequal.

4. The optical film as in claim 1, wherein the second and third refraction coefficients are equal for the lower and upper pyramids of each element.

5. The optical film as in claim 1, wherein the second and third refraction coefficients are equal for the lower and upper pyramids of the set of elements.

6. The optical film as in claim 1, wherein the lower and upper pyramids are asymmetrical.

7. The optical film as in claim 1, wherein the refraction coefficients of the first layer, the second layer and the third layer, and the second and third refraction coefficients are in the range of about 1 to about 2.1.

8. The optical film as in claim 1, wherein the plurality of element planes further comprises the first lower base and the second upper base.

9. The optical film as in claim 1, wherein the element planes and the external material comprise an antireflective layer.

10. The optical film as in claim 1, wherein the first and second layers of the external material comprise different refraction coefficients.

11. The optical film as in claim 1, wherein the first, second and third layers of the external material comprise different refraction coefficients.

12. The optical film as in claim 1, wherein the second layer and the third layer are substantially planar.

13. An optical film comprising:
   a set of elements disposed adjacent to each other; and
   an external surface comprising an external material and a first refraction coefficient;
   wherein each element comprises;
      a lower pyramid comprising a first lower base, a first upper base, a first vertex angle, a plurality of first inclined planes and a second refraction coefficient, the lower pyramid being a truncated pyramid and edge angles of the lower pyramid being substantially the same with each other;
      an intermediate pyramid comprising a second lower base, a second upper base, a second vertex angle, a plurality of second inclined planes and a third refraction coefficient, the intermediate pyramid being a truncated pyramid and edge angles of the intermediate pyramid being substantially the same with each other;
      an upper pyramid comprising a third lower base, a third upper base, a third vertex angle, a plurality of third inclined planes and a fourth refraction coefficient, the upper pyramid being a non-truncated pyramid and edge angles of the upper pyramid being substantially the same with each other; and
      a plurality of element planes comprising the first, second and third inclined planes;
   wherein the first lower base defines a base of the element and the first and second upper base coincide with the second and third lower base, respectively;
   wherein bases of each element disposed adjacent to one another form a common surface of the plurality of elements, the lower, intermediate and upper pyramids protruding from one side of the common surface;
   wherein the external material covers the plurality of element planes, and
   wherein the first vertex angle is larger than the second vertex angle, and the second vertex angle is larger than the third vertex angle.

* * * * *